United States Patent
Kean et al.

(10) Patent No.: US 11,966,220 B2
(45) Date of Patent: Apr. 23, 2024

(54) METHOD AND USER INTERFACE FOR SELECTIVELY ASSISTED AUTOMATION OF LOADING OPERATION STAGES FOR WORK VEHICLES

(71) Applicant: Deere & Company, Moline, IL (US)

(72) Inventors: Michael G. Kean, Maquoketa, IA (US); Giovanni A. Wuisan, Epworth, IA (US)

(73) Assignee: Deere & Company, Moline, IL (US)

( * ) Notice: Subject to any disclaimer, the term of this patent is extended or adjusted under 35 U.S.C. 154(b) by 388 days.

(21) Appl. No.: 17/329,235

(22) Filed: May 25, 2021

(65) Prior Publication Data

US 2022/0382274 A1  Dec. 1, 2022

(51) Int. Cl.
*G05D 1/00* (2006.01)
*E02F 9/20* (2006.01)

(52) U.S. Cl.
CPC ......... *G05D 1/0016* (2013.01); *E02F 9/2037* (2013.01); *E02F 9/205* (2013.01); *E02F 9/2054* (2013.01); *G05D 1/0027* (2013.01); *G05D 1/0088* (2013.01); *G05D 2201/0202* (2013.01)

(58) Field of Classification Search
CPC .. G05D 1/0016; G05D 1/0027; G05D 1/0088; G05D 2201/0202; G05D 1/0038; E02F 9/2037; E02F 9/205; E02F 9/2054; E02F 3/434; E02F 9/264; E02F 3/303; E02F 9/2029; E02F 9/2095
See application file for complete search history.

(56) References Cited

U.S. PATENT DOCUMENTS

| | | | |
|---|---|---|---|
| 7,671,725 | B2 | 3/2010 | Tsuji et al. |
| 8,843,311 | B2 | 9/2014 | Takeda |
| 8,954,252 | B1 | 2/2015 | Urmson et al. |
| 9,415,953 | B2 | 8/2016 | Bonefas |
| 9,712,791 | B2 | 7/2017 | Kim et al. |
| 9,908,385 | B2 | 3/2018 | Chundrlik, Jr. et al. |
| 9,946,451 | B2 | 4/2018 | Kim et al. |
| 10,479,354 | B2 | 11/2019 | Posselius et al. |
| 2015/0189216 | A1 | 7/2015 | Fukuchi et al. |

(Continued)

FOREIGN PATENT DOCUMENTS

JP  2021188258 A  * 12/2021

*Primary Examiner* — Donald J Wallace
(74) *Attorney, Agent, or Firm* — Gary L. Montle; Lucian Wayne Beavers; Patterson Intellectual Property Law, PC

(57) ABSTRACT

A system and method of selective input confirmation for automated loading by a work vehicle comprising a main frame and a work attachment movable with respect to the main frame for loading/unloading material in a loading area external to the work vehicle during a loading process having loading stages. Location inputs are detected for the loading area respective to the main frame and/or work attachment. First user inputs correspond to selected automation for respective loading stages, for which detection routines are executed with respect to parameters of the loading area based on the detected location inputs. If second user inputs are determined to be required with respect to certain parameters of the loading area, the second user inputs are received and movement of the main frame and/or work attachment are controlled for automating the corresponding loading stages based at least in part thereon.

18 Claims, 15 Drawing Sheets

(56) References Cited

U.S. PATENT DOCUMENTS

| | | |
|---|---|---|
| 2017/0131722 A1 | 5/2017 | Hiramatsu et al. |
| 2017/0135277 A1 | 5/2017 | Hiramatsu et al. |
| 2017/0220044 A1* | 8/2017 | Sakai .................. G05D 1/0219 |
| 2018/0035050 A1 | 2/2018 | Lu et al. |
| 2018/0119384 A1* | 5/2018 | Imaizumi ................ E02F 9/265 |

* cited by examiner

METHOD AND USER INTERFACE FOR SELECTIVELY ASSISTED AUTOMATION OF LOADING OPERATION STAGES FOR WORK VEHICLES

FIELD OF THE DISCLOSURE

The present disclosure relates generally to work vehicles, and more particularly to systems and methods for selective automation of vehicle movements and/or work attachment movements during specified portions of loading operations.

BACKGROUND

Work vehicles as discussed herein may particularly refer to wheel loaders for illustrative purposes, but may also for example include excavator machines, forestry machines, and other equipment which modify the terrain or equivalent working environment in some way. The work vehicles as discussed herein are frequently self-propelled via tracked or wheeled ground engaging units supporting the undercarriage from the ground surface, and may further include one or more work attachments which are used to carry material from one location for discharging into a loading area such as for example associated with a truck or hopper. However, some work vehicles within the scope of the present disclosure are not necessarily self-propelled, such as for example knuckle boom loaders and the like.

One of skill in the art will appreciate the persistent challenge in finding experienced operators for certain conventional work vehicles. With respect to wheel loaders as exemplary such work vehicles, one particularly challenging portion of the operating cycle for novice operators is that of approaching and loading a loading area such as for example associated with a truck or hopper. Novice operators may typically learn the 'dig' portion of the operating cycle relatively quickly but will often continue for some time to be hesitant when approaching a truck or hopper.

As one example, an operation for discharging bulk material from the attachment (e.g., bucket) of the work vehicle may include pivoting movements of the attachment relative to the main frame of the work vehicle and to the loading area, and further includes movement of the work vehicle itself relative to the ground and to the loading area. Accordingly, care must be taken that the attachment and/or other portions of the work vehicle do not collide with the loading area during the discharging operation, which may include not only an approach by the attachment to the loading area but also a withdrawal of the attachment after the discharge of bulk material is complete.

BRIEF SUMMARY

The current disclosure provides an enhancement to conventional systems, at least in part by introducing a novel system and method for a selective loading assist feature.

One exemplary objective of such a loading assist feature may be to add value to a customer by automating aspects of a truck loading operation related to controlling attachment (e.g., boom) motion and/or work vehicle stopping distance with respect to a loading area. The loading area may for example be the bed of a dump truck, a hopper, a trailer, etc., and accordingly the term may encompass both mobile and stationary containers and associated loading areas as understood by one of skill in the art.

A detection system such as for example including a stereo camera may be used to measure the distance to the loading area as well as the height of the top edge of the loading area from the ground and the extents of the loading area horizontally. One of the challenges in operating such a system may be that the point cloud data measured using stereo disparity is not always crisp. There may be many defects, especially in the presence of visual phenomena like reflections, glare, and partial obscurants like fog. In this case, the system may be capable of automatically identifying the distance to the side of the loading area but not the properties related to the edges of the loading area.

In this case, the system may flag the operator that attention is needed and obtain from the operator several types of visual context to the camera system that would trigger additional detection subroutines. As disclosed herein, such a collaboration methodology may include an auto-loading feature that leverages vision sensors to identify a loading area (e.g., truck or hopper) and enables a work vehicle to automatically load material into the loading area once the bucket on the work vehicle has been filled.

In certain embodiments, a method as disclosed herein may be implemented when one operator is inside the cab of the work vehicle overseeing operation of the automated system. In other embodiments, a method as disclosed herein may be implemented for remote operation or in the case where one operator is overseeing a fleet of autonomous vehicles and must be able to quickly and effectively help a semi-autonomous vehicle resolve issues and remain operational.

Accordingly, a system and method as disclosed herein may not only provide site owners with increased confidence that even a new operator will not contact the truck bed or hopper with the loader bucket when loading it, but an approach as disclosed herein may further serve as a middle ground for autonomy—the work vehicle system can utilize simpler/faster algorithms that do not necessarily rely on machine learning and the operator can quickly and remotely add the visual context desired of a machine learning classification algorithm when it is necessary for the operation of the semi-autonomous system.

In one embodiment, a computer-implemented method as disclosed herein is provided for selective input confirmation for automated loading by a work vehicle comprising a plurality of ground engaging units supporting a main frame, and at least one work attachment movable with respect to the main frame and configured for loading and unloading material in a loading area external to the work vehicle during a loading process having one or more loading stages. The method includes detecting, via at least one detector associated with the work vehicle, one or more location inputs for the loading area respective to the main frame and/or at least one work attachment. The method further includes receiving first user inputs corresponding to selected automation for any one or more of the one or more loading stages, and for one or more selectively automated loading stages, executing detection routines with respect to parameters of the loading area based on the detected one or more location inputs, and determining whether one or more second user inputs are required with respect to one or more of the parameters of the loading area. For any one or more of the parameters of the loading area requiring second user inputs, the method further includes receiving the one or more second user inputs and automatically controlling at least movement of the main frame and/or the at least one work attachment for automating the corresponding loading stages based at least in part thereon.

In one exemplary aspect according to the above-referenced embodiment, for any one or more of the parameters of the loading area requiring one or more second user inputs, user input of the one or more second user inputs may be prompted via a user interface and receiving the one or more second user inputs thereby.

In another exemplary aspect according to the above-referenced embodiment, the step of detecting one or more location inputs may comprise capturing images via an imaging device.

In another exemplary aspect according to the above-referenced embodiment, the loading area parameters may comprise one or more of: a distance between the loading area and the main frame; a distance between the loading area and the at least one work attachment; an orientation of the loading area respective to the main frame and/or at least one work attachment; a height of the loading area; polygonal contours of a container associated with the loading area; and circular or elliptical contours of vehicle wheels supporting the loading area.

In another exemplary aspect according to the above-referenced embodiment, the method may further include generating an image of the loading area on a user interface at least in association with a requirement of one or more second user inputs, and wherein the one or more second user inputs comprise one or more engagement points with respect to the user interface and/or a sustained movement of the engagement point there along.

Further in accordance with this exemplary aspect, the method may comprise automatically estimating one or more contours of a container associated with the loading area based at least on the generated image of the loading area and the one or more second user inputs comprising a swiped engagement of the user interface.

Further in accordance with this exemplary aspect, the method may comprise automatically estimating one or more contours of a container associated with the loading area based at least on the generated image of the loading area and the one or more second user inputs comprising a plurality of swiped engagements of the user interface to define a closed area therein.

Further in accordance with this exemplary aspect, the method may comprise automatically estimating a contour of a vehicle wheel associated with the loading area based at least on the generated image of the loading area and the one or more second user inputs comprising a circular or elliptical swiped engagement of the user interface to define a closed area therein.

Further in accordance with this exemplary aspect, the method may comprise automatically estimating a contour of a vehicle wheel associated with the loading area based at least on the generated image of the loading area and the one or more second user inputs comprising one or more tapped engagements via the user interface.

Another embodiment as disclosed herein may be provided with respect to a work vehicle comprising a plurality of ground engaging units supporting a main frame and at least one work attachment movable with respect to the main frame and configured for loading and unloading material in a loading area external to the work vehicle at least during a loading process having one or more loading stages. At least one detector is configured to detect one or more location inputs for the loading area respective to the main frame and/or at least one work attachment. A user interface is configured to enable at least first user inputs corresponding to selected automation for any one or more of the one or more loading stages. A controller is provided and further configured to direct the performance of a method according to the above-referenced embodiment and optional exemplary aspects.

In another embodiment as disclosed herein, a system may be provided for automation assistance for a plurality of work vehicles substantially in accordance with the above-referenced embodiments, wherein a user computing device is remotely arranged with respect to each of the plurality of work vehicles, and comprises a user interface configured to enable at least first user inputs for respective work vehicles corresponding to selected automation for any one or more of the one or more loading stages. Each of the plurality of work vehicles further comprises a controller respectively configured to direct the performance of a method according to the above-referenced embodiment and optional exemplary aspects.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-15, various embodiments may now be described of an inventive system and method.

Figure 1:
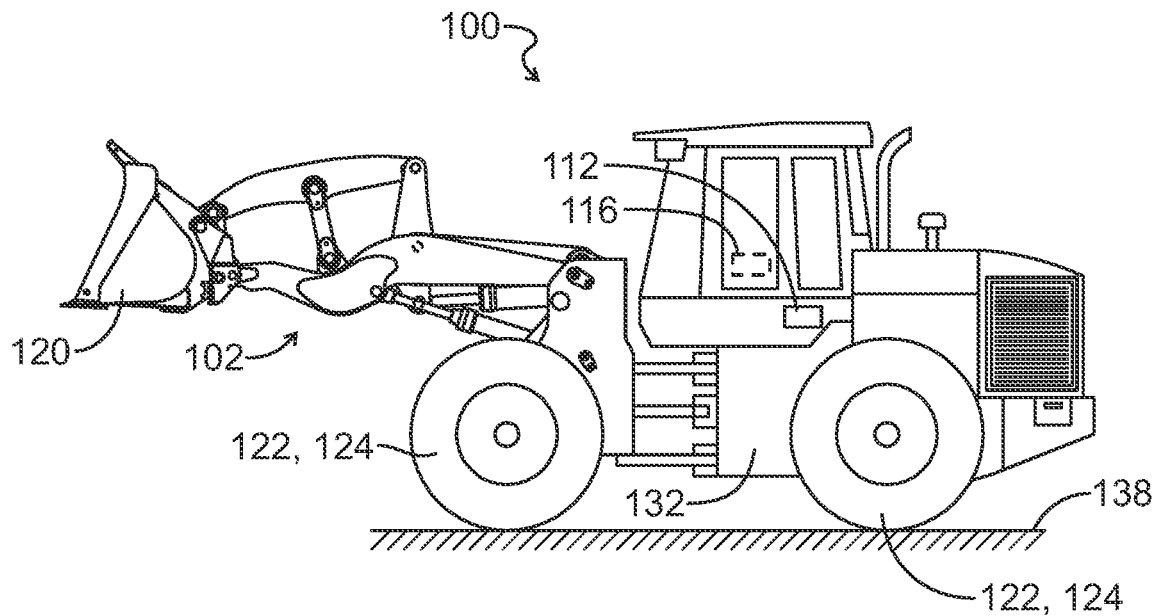
FIG. 1 is a side view of an exemplary embodiment of a work vehicle according to the present disclosure.

FIG. 1 in a particular embodiment as disclosed herein shows a representative work vehicle 100 in the form of, for example, a loader having a front-mounted work attachment 120 for modifying the proximate terrain. It is within the scope of the present disclosure that the work vehicle 100 may be in the form of any other self-propelled vehicle using one or more working implements 120 to modify the proximate terrain and to carry material from the terrain for loading into a loading area, and generally designed for use in off-highway environments such as a construction or forestry vehicle, for example. In the remaining examples provided herein, the working implements 120 are referred to as work attachments, but the scope of the present disclosure contemplates the use of a variety of implements and is not limited to the examples specifically provided herein unless otherwise stated.

In various embodiments as further described herein, the loading area is associated with a truck and typically includes a loading surface surrounded by a plurality of walls and an open area opposite the loading surface to accommodate the discharge of material thereinto.

The illustrated work vehicle 100 includes a main frame 132 supported by a first pair of wheels as left-side ground engaging units 122 and a second pair of wheels as right-side ground engaging units 124, and at least one travel motor (not shown) for driving the ground engaging units. Although wheels are used in the illustrated embodiment, it may be contemplated within the scope of the present disclosure that the ground engaging units are tracked.

The work attachment 120 for the illustrated work vehicle 100 comprises a front-mounted loader bucket 120 coupled to a boom assembly 102. The loader bucket 120 faces generally away from the operator of the loader 100 and is moveably coupled to the main frame 132 via the boom assembly 102 for forward-scooping, carrying, and dumping dirt and other materials for example into a loading area 302 such as associated with an articulated dump truck. In an alternative embodiment wherein the work vehicle is for example a tracked excavator, the boom assembly 102 may be defined as including at least a boom and an arm pivotally connected to the boom. The boom in the present example is pivotally attached to the main frame 132 to pivot about a generally horizontal axis relative to the main frame 132. A coupling mechanism may be provided at the end of the boom assembly 102 and configured for coupling to the work attachment 120, which may also be characterized as a working tool, and in various embodiments the boom assembly 102 may be configured for engaging and securing various types and/or sizes of attachment implements 120.

In other embodiments, depending for example on the type of work vehicle 100, the work attachment 120 may take other appropriate forms as understood by one of skill in the art, but for the purposes of the present disclosure will comprise work attachments 120 for carrying material from a first location for discharging or otherwise unloading into a second location as a loading area (e.g., a truck or hopper) 300.

An operator's cab may be located on the main frame 132. The operator's cab and the boom assembly 102 (or the work attachment 120 directly, depending on the type of work vehicle 100) may both be mounted on the main frame 132 so that the operator's cab faces in the working direction of the work attachments 120. A control station including a user interface 116 may be located in the operator's cab. As used herein, directions with regard to work vehicle 100 may be referred to from the perspective of an operator seated within the operator cab; the left of the work vehicle is to the left of such an operator, the right of the work vehicle is to the right of such an operator, a front-end portion (or fore) 102 of the work vehicle is the direction such an operator faces, a rear-end portion (or aft) of the work vehicle is behind such an operator, a top of the work vehicle is above such an operator, and a bottom of the work vehicle below such an operator.

One example of a user interface 116 as described herein may be provided as part of a display unit configured to graphically display indicia, data, and other information, and in some embodiments may further provide other outputs from the system such as indicator lights, audible alerts, and the like. The user interface may further or alternatively include various controls or user inputs (e.g., a steering wheel, joysticks, levers, buttons) 208 for operating the work vehicle 100, including operation of the engine, hydraulic cylinders, and the like. Such an onboard user interface may be coupled to a vehicle control system via for example a CAN bus arrangement or other equivalent forms of electrical and/or electro-mechanical signal transmission. Another form of user interface as disclosed herein may take the form of a display unit that is generated on a remote (i.e., not onboard) computing device, which may display outputs such as status indications and/or otherwise enable user interaction such as the providing of inputs to the system. In the context of a remote user interface, data transmission between for example the vehicle control system and the user interface may take the form of a wireless communications system and associated components as are conventionally known in the art. In certain embodiments, a remote user interface and vehicle control systems for respective work vehicles may be further coordinated or otherwise interact with a remote server or other computing device for the performance of operations in a system as disclosed herein.

Figure 2:
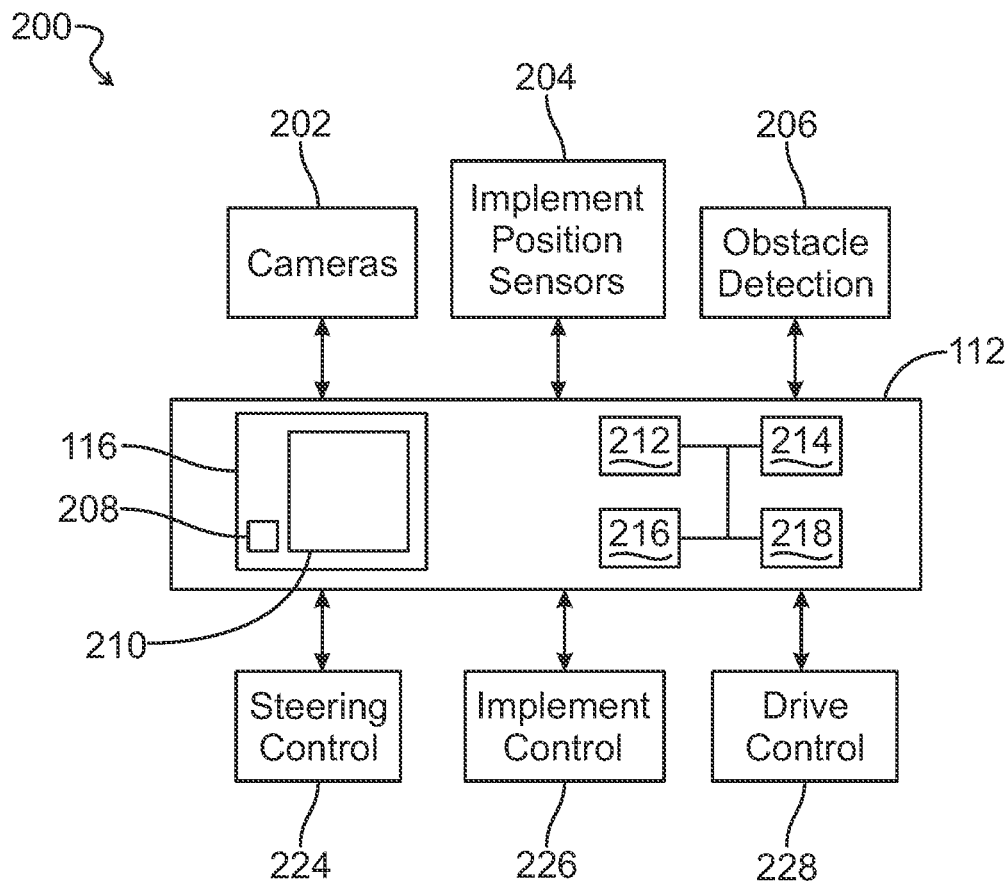
FIG. 2 is a block diagram representing a control system according to an embodiment of the present disclosure.

As also schematically illustrated in FIG. 2, the work vehicle 100 includes a control system 200 including a controller 112. The controller 112 may be part of the machine control system of the work vehicle, or it may be a separate control module. The controller 112 may include the user interface 116 and optionally be mounted in the operator cab at a control panel.

The controller 112 is configured to receive inputs from some or all of various sources including image data sources such as a camera system 202, work vehicle motion sensors 204, and machine parameters 206 such as for example from the user interface 116 and/or a machine control system for the work vehicle if separately defined with respect to the controller.

The image data sources such as camera system 202 is appropriate embodiments may comprise one or more detectors which may for example be imaging devices such as cameras 202 mounted on the work vehicle 100 and arranged to capture images or otherwise generate image data corresponding to surroundings of the work vehicle 100. The camera system 202 may include video cameras configured to record an original image stream and transmit corresponding data to the controller 112. In the alternative or in addition, the camera system 202 may include one or more of an infrared camera, a stereoscopic camera, a PMD camera, or the like. One of skill in the art may appreciate that high resolution light detection and ranging (LiDAR) scanners, radar detectors, laser scanners, and the like may be implemented as image data sources within the scope of the present disclosure. The number and orientation of said image data sources may vary in accordance with the type of work vehicle and relevant applications, but may at least be provided with respect to an area in a traveling direction of the work vehicle 100 and configured to capture image data associated with a loading area 302 toward which the work vehicle 100 is traveling. The position and size of an image region recorded by a respective camera 202 may depend on the arrangement and orientation of the camera and the camera lens system, in particular the focal length of the lens of the camera, but may desirably be configured to capture substantially the entire loading area 302 throughout an approach and withdrawal of the work vehicle 100 and the associated attachment 120 during a loading operation. One of skill in the art may further appreciate that image data processing functions may be performed discretely at a given image data source if properly configured, but also or otherwise may generally include at least some image data processing by the controller or other downstream data processor. For example, image data from any one or more image data sources may be provided for three-dimensional point cloud generation, image segmentation, object delineation and classification, and the like, using image data processing tools as are known in the art in combination with the objectives disclosed herein.

An exemplary work vehicle motion sensing system 204 may include inertial measurement units (IMUs) mounted to respective components of the work attachment 120 and/or boom assembly 102 and/or main frame 132, sensors coupled to piston-cylinder units to detect the relative hydraulically actuated extensions thereof, or any known alternatives as may be known to those of skill in the art.

In various embodiments, additional sensors may be provided to detect machine operating conditions or positioning, including for example an orientation sensor, global positioning system (GPS) sensors, vehicle speed sensors, vehicle implement positioning sensors, and the like, and whereas one or more of these sensors may be discrete in nature the sensor system may further refer to signals provided from the machine control system.

In an embodiment, any of the aforementioned sensors may be supplemented using radio frequency identification (RFID) devices or equivalent wireless transceivers on one or more attachments 120, the loading area 302, and the like. Such devices may for example be implemented to determine and/or confirm a distance and/or orientation there between.

Other sensors may collectively define an obstacle detection system 206, alone or in combination with one or more aforementioned sensors for improved data collection, various examples of which may include ultrasonic sensors, laser scanners, radar wave transmitters and receivers, thermal sensors, imaging devices, structured light sensors, other optical sensors, and the like. The types and combinations of sensors for obstacle detection may vary for a type of work vehicle, work area, and/or application, but generally may be provided and configured to optimize recognition of objects proximate to, or otherwise in association with, a determined working area of the vehicle and/or associated loading area 302 for a given application.

The controller 112 may typically coordinate with the above-referenced user interface 116 for the display of various indicia to the human operator. The controller 112 may further generate control signals for controlling the operation of respective actuators, or signals for indirect control via intermediate control units, associated with a machine steering control system 224, a machine attachment control system 226, and/or a machine drive control system 228. The controller 112 may for example generate control signals for controlling the operation of various actuators, such as hydraulic motors or hydraulic piston-cylinder units, and electronic control signals from the controller 112 may actually be received by electro-hydraulic control valves associated with the actuators such that the electro-hydraulic control valves will control the flow of hydraulic fluid to and from the respective hydraulic actuators to control the actuation thereof in response to the control signal from the controller 112. The controller 112 further communicatively coupled to a hydraulic system as machine attachment control system 226 may accordingly be configured to operate the work vehicle 100 and operate an attachment 120 coupled thereto, including, without limitation, the attachment's lift mechanism, tilt mechanism, roll mechanism, pitch mechanism and/or auxiliary mechanisms, for example and as relevant for a given type of attachment or work vehicle application. The controller 112 further communicatively coupled to a hydraulic system as machine steering control system 224 and/or machine drive control system 228 may be configured for moving the work vehicle in forward and reverse directions, moving the work vehicle left and right, controlling the speed of the work vehicle's travel, etc.

The controller 112 includes or may be associated with a processor 212, a computer readable medium 214, a communication unit 216, data storage 218 such as for example a database network, and the aforementioned user interface 116 or control panel having a display 210. An input/output device 208, such as a keyboard, joystick or other user interface tool, is provided so that the human operator may input instructions to the controller 112. It is understood that the controller 112 described herein may be a single controller having all of the described functionality, or it may include multiple controllers wherein the described functionality is distributed among the multiple controllers.

Various operations, steps or algorithms as described in connection with the controller 112 can be embodied directly in hardware, in a computer program product such as a software module executed by the processor 212, or in a combination of the two. The computer program product can reside in RAM memory, flash memory, ROM memory, EPROM memory, EEPROM memory, registers, hard disk, a removable disk, or any other form of computer-readable medium 214 known in the art. An exemplary computer-readable medium 214 can be coupled to the processor 212 such that the processor 212 can read information from, and write information to, the memory/storage medium 214. In the alternative, the medium 214 can be integral to the processor 212. The processor 212 and the medium 214 can reside in an application specific integrated circuit (ASIC). The ASIC can reside in a user terminal. In the alternative, the processor 212 and the medium 214 can reside as discrete components in a user terminal.

The term "processor" 212 as used herein may refer to at least general-purpose or specific-purpose processing devices and/or logic as may be understood by one of skill in the art, including but not limited to a microprocessor, a microcontroller, a state machine, and the like. A processor 212 can also be implemented as a combination of computing devices, e.g., a combination of a DSP and a microprocessor, a plurality of microprocessors, one or more microprocessors in conjunction with a DSP core, or any other such configuration.

The communication unit 216 may support or provide communications between the controller 112 and external systems or devices, and/or support or provide communication interface with respect to internal components of the work vehicle 100. The communications unit may include wireless communication system components (e.g., via cellular modem, WiFi, Bluetooth or the like) and/or may include one or more wired communications terminals such as universal serial bus ports.

The data storage 218 as discussed herein may, unless otherwise stated, generally encompass hardware such as volatile or non-volatile storage devices, drives, memory, or other storage media, as well as one or more databases residing thereon.

Figure 13:
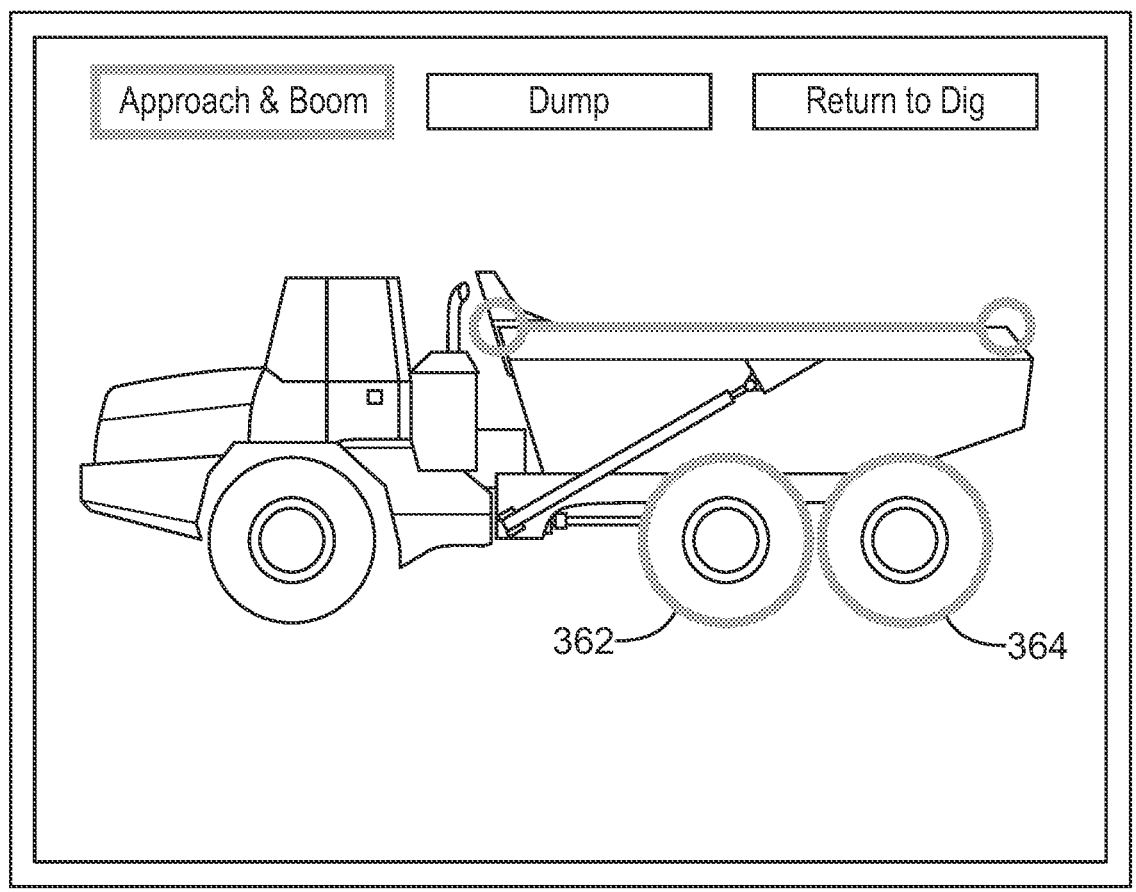
FIG. 13 is a graphical diagram representing the user interface of FIG. 7, displaying the loading area and highlighting that the contours are sufficiently detectable for automated approach.
Figure 14:
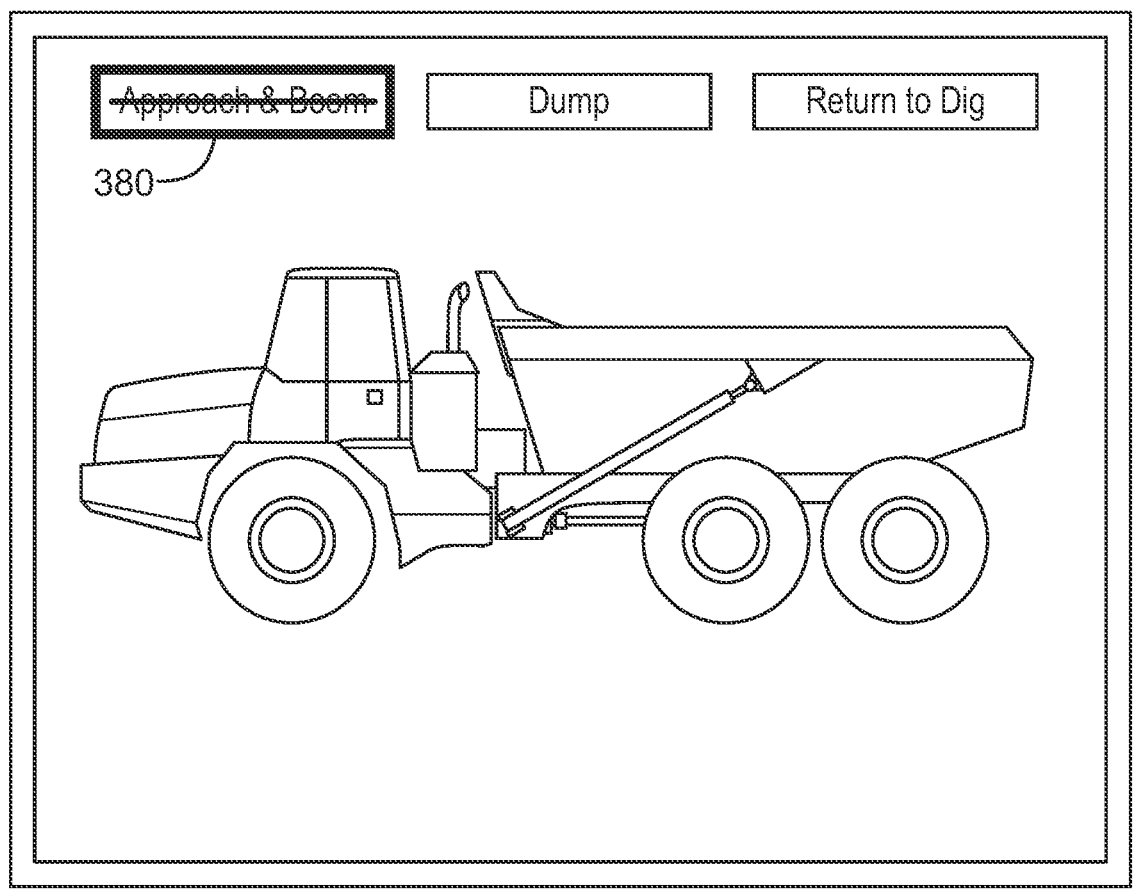
FIG. 14 is a graphical diagram representing the user interface of FIG. 3, displaying the loading area and highlighting that the contours are not sufficiently detectable for automated approach, even after user assistance.
Figure 15:
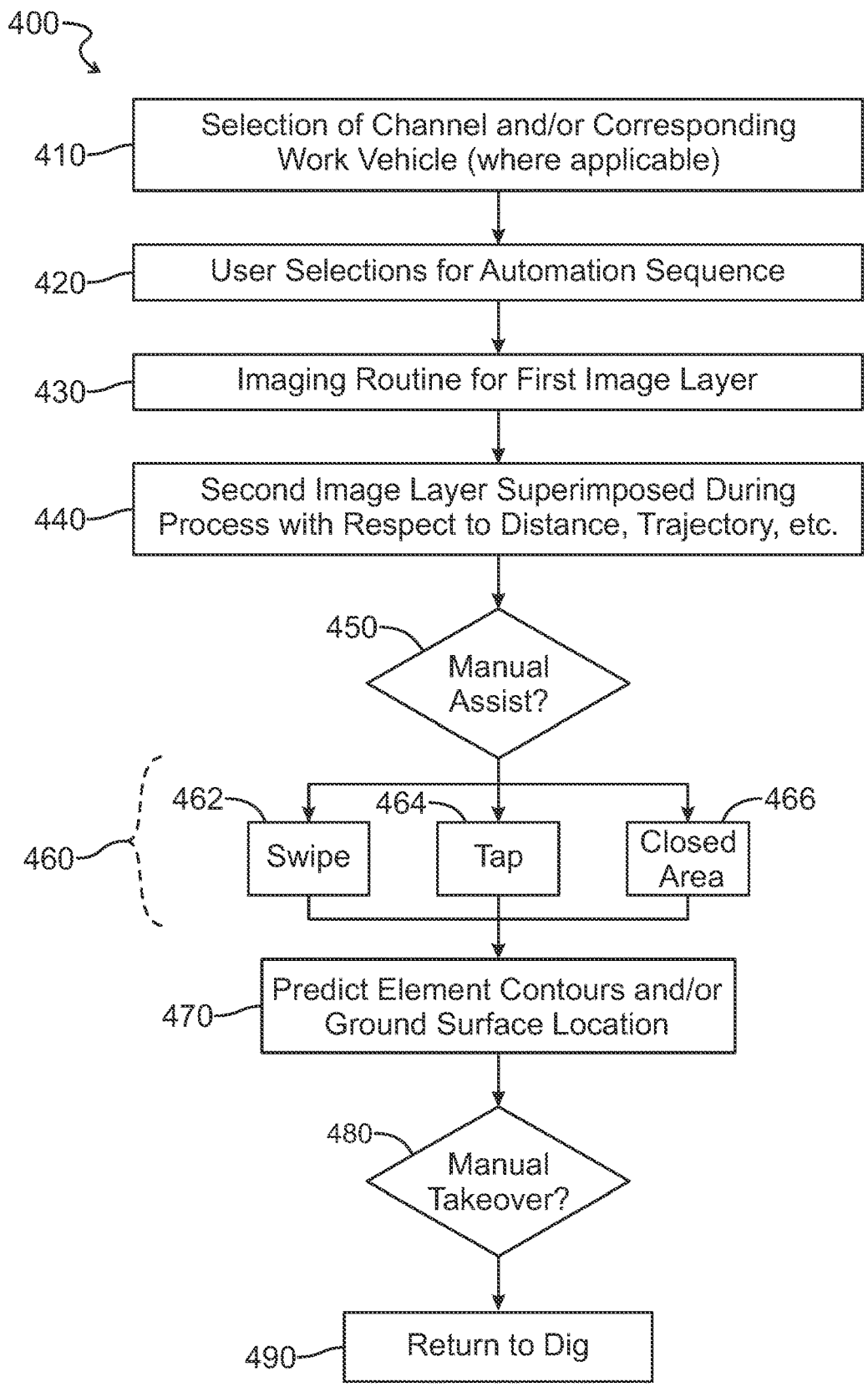
FIG. 15 is a flowchart representing an exemplary method according to an embodiment of the present disclosure.

Referring next to FIG. 15, with further illustrative reference to FIGS. 3-14, an embodiment of a method 400 may now be described which is exemplary but not limiting on the scope the present disclosure unless otherwise specifically noted. One of skill in the art may appreciate that alternative embodiments may include fewer or additional steps, and that certain disclosed steps may for example be performed in different chronological order or simultaneously.

In an embodiment, as previously noted, a remote user may be able to selectively assist in automation for a plurality of work vehicles, wherein a first step 410 of the method 400 may accordingly include the selection of a communications channel and/or corresponding work vehicle via a user interface 116 generated by the system. Upon selection of a particular channel, an image produced by sensors/cameras 202 for the corresponding work vehicle may be generated. The user interface 116 may also be prompted via push notifications from respective work vehicles or a central server and generate images for review and interaction by the user.

This step 410 may of course be omitted for embodiments where for example a user is physically present for operation of respective work vehicle, and a user interface is individually generated for each said work vehicle.

Figure 3:
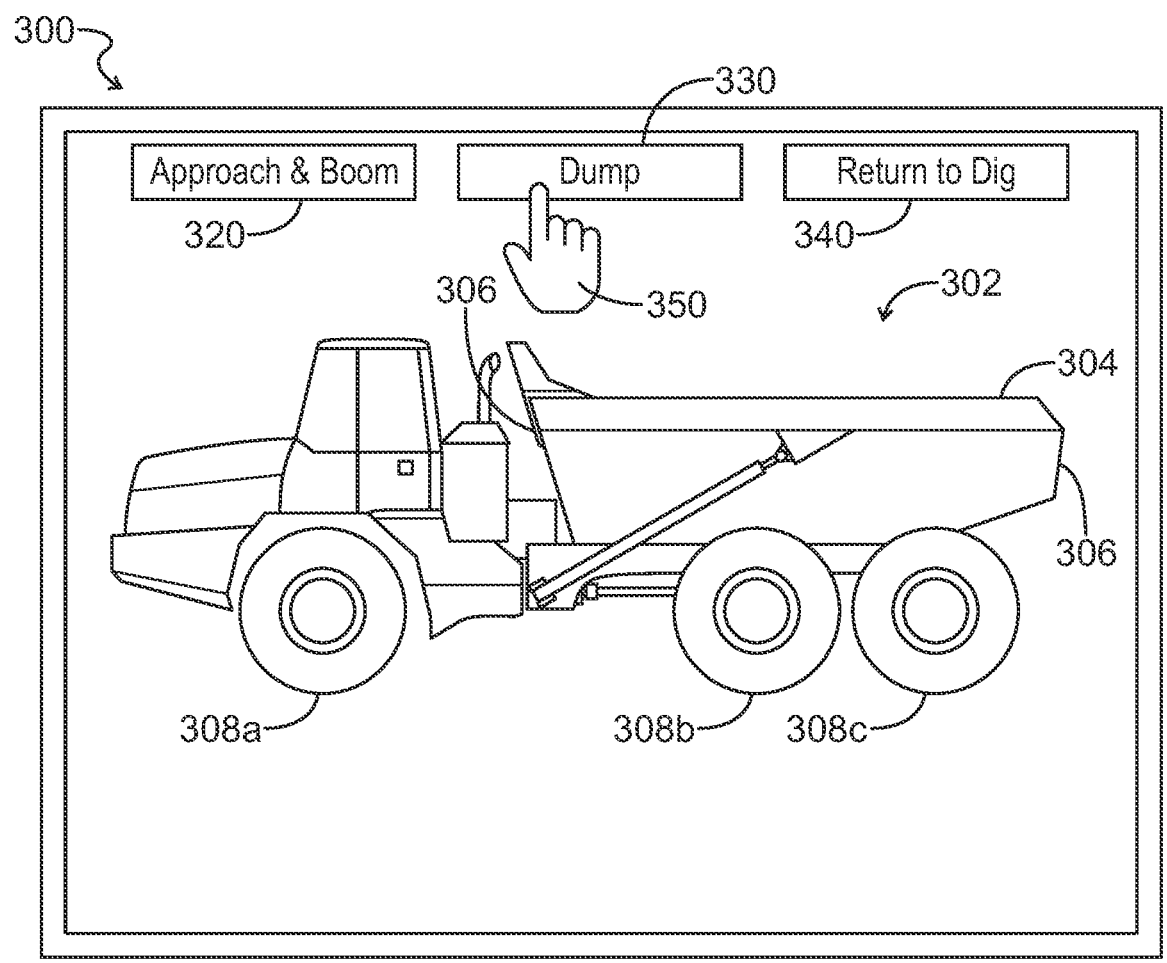
FIG. 3 is a graphical diagram representing a user interface displaying a loading area and user-selectable stages of a loading process.

In another step 420, the method 400 may include the user interface 116 enabling user selection of one or more portions of a loading sequence for automation. As represented in FIG. 3, a touch screen as the user interface 116 may be caused to generate a contextual input display 300 including one or more user selectable buttons or equivalent interface tools associated with different portions of the loading sequence, such as for example a first portion 320 relating to an approach of the work vehicle 100 and/or attachments (e.g., boom) 120 to the loading area 302 (e.g., "Approach & Boom), a second portion 330 relating to loading of material from the work vehicle attachment 120 into the loading area 302 (e.g., "Dump"), and a third portion 340 relating to withdrawal of the work vehicle 100 and/or attachments 120 from the loading area 302 and/or transition to a separate sequence of the work vehicle operation (e.g., "Return to Dig"). Also as shown in FIG. 3, a cursor, touchscreen engagement point 350, or an equivalent may be implemented for selection from among the various buttons.

In another step 430, the method 400 may include generating the contextual input display 300 including a first image layer on the user interface 116 corresponding to captured images of a loading area 302 such as for example associated with a dump truck having a plurality of wheels 308a, 308b, 308c and associated axles supporting a loading container (e.g., truck bed) having for example a loading surface at the bottom of an interior area surrounded by sidewalls 306, and a top edge 304 at least part of which may typically be in parallel with the ground surface 138.

Figure 4:
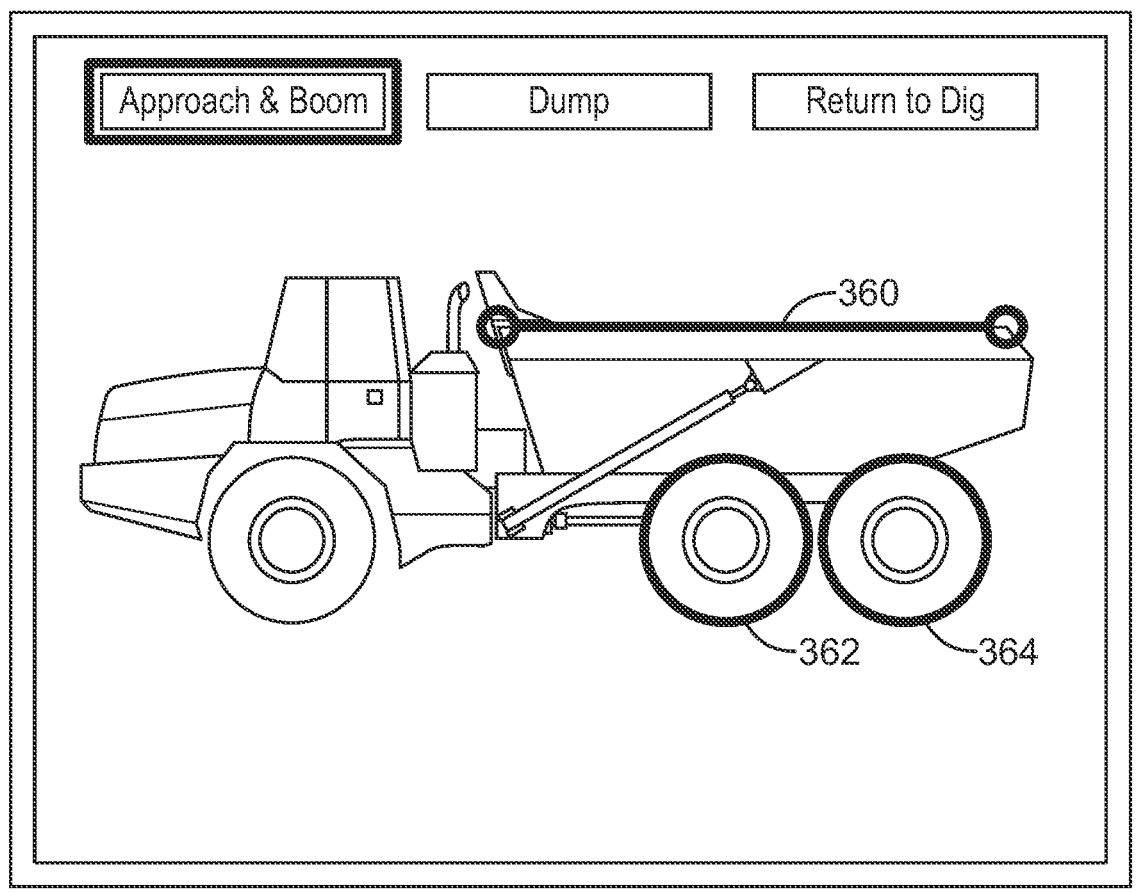
FIG. 4 is a graphical diagram representing the user interface of FIG. 3, displaying a loading area and certain highlighted contours thereof.
Figure 5:
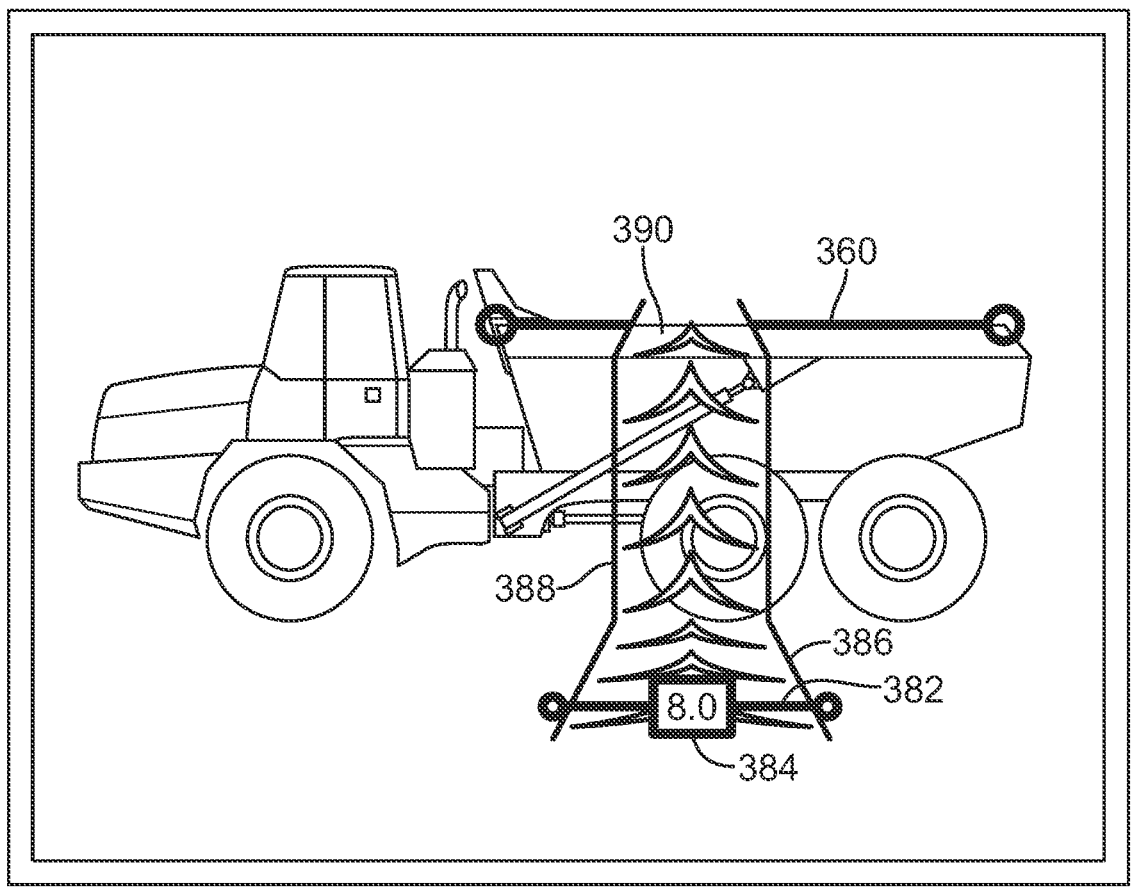
FIG. 5 is a graphical diagram representing the user interface of FIG. 3, displaying a loading area and a superimposed track for approach to the loading area.
Figure 6:
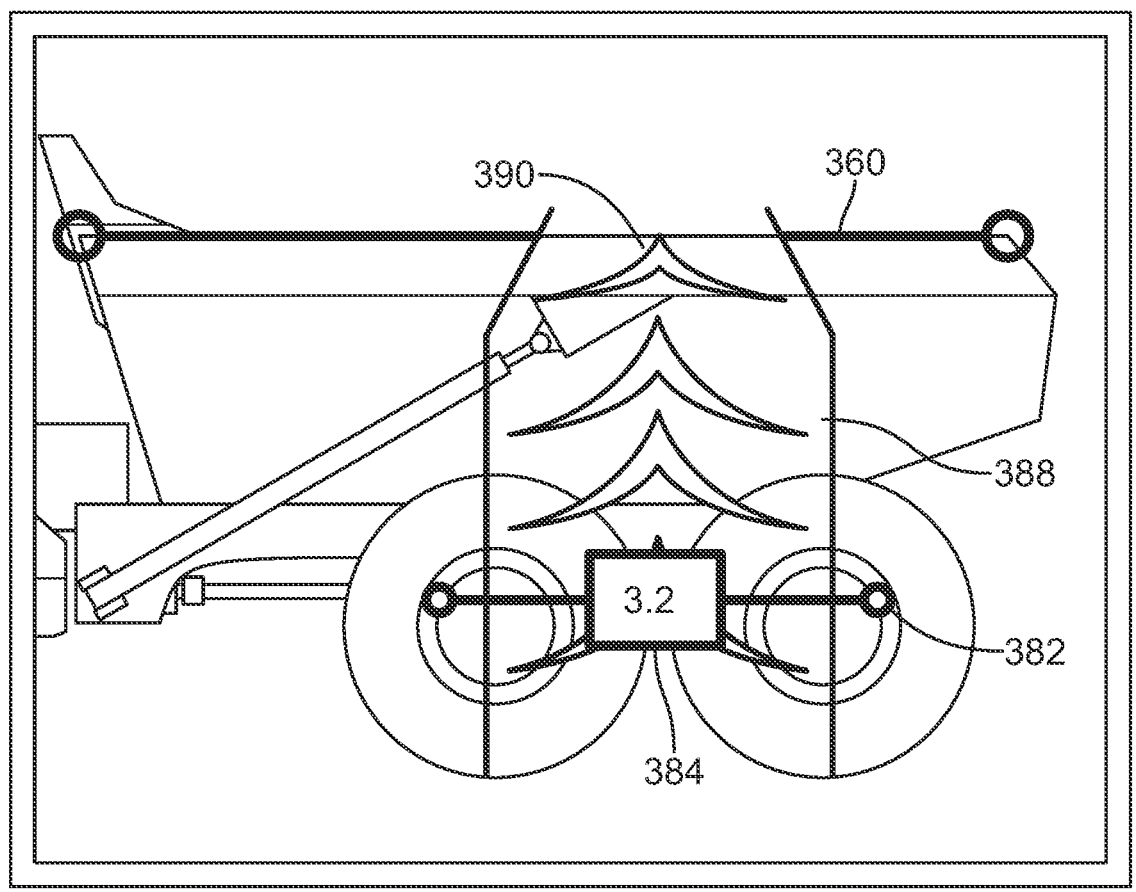
FIG. 6 is a graphical diagram representing the user interface of FIG. 5, displaying the loading area and the superimposed track for approach to the loading area after having approached a horizontal distance with respect thereto.

As further represented in FIGS. 4-6, an imaging routine may be executed by the system to process defined portions of the first image layer and programmatically determine or otherwise estimate parameters associated with the loading area 302. In step 440, the method 400 may include generating a second image layer as for example an augmented reality image layer superimposed with respect to the first image layer. Such a second image layer may for example provide visual indicia to a user with respect to determined or otherwise estimated parameters such as a distance between a portion of the loading area 302 and a portion of the work vehicle 100, a height of a portion of the loading area 302 with respect to the ground surface 138, a trajectory to be taken between a current position of the work vehicle 100 (and/or attachment 120) and a portion of the loading area 302, etc.

In one embodiment an imaging routine according to the method 400 may include processing of stereo camera disparity measurements and stored or otherwise developed models in order to segment respective measurements into a floor plane associated for example with the loading surface, loading area sidewalls 306, a top edge of the bin 304, and the like, wherein said processing may account for a position, orientation, moving speed, etc., of the camera 202. Segmentation may in some embodiments be further improved via known indicia (e.g., printed text, barcodes, etc.) associated with the loading area 302, the attachments 120, or other objects within the image frame. In embodiments where multiple imaging devices 202 may be utilized, a known relative position and orientation of the imaging devices may further enable object position determination through for example triangulation techniques. Briefly stated, the controller 112 and/or a discrete image processing unit (not shown) may for example utilize conventional image recognition and processing techniques, floor plane modeling, machine learning algorithms, stored loading area data, and the like to analyze the shape and size of an object, to measure a distance to the object from the stereo camera, to identify or predict the extent of the object in the image frame, to measure the orientation of the object in the image frame, and to convert the measurements from the image frame into the work vehicle frame.

However, it should be noted that the above-referenced techniques are not required, and indeed one of the potential advantages of contextual inputs as made available by the present disclosure is to mitigate the problems in any inability of complex image processing techniques or other aspects of the system to properly identify all elements in the image frame.

Returning now to FIG. 4, for the selected first portion 320 of the loading sequence, the system in an embodiment identifies parameters from the first image layer and generates as a second image layer a first indicia 360 corresponding to the top edge 304 of the truck bin, a second indicia 362 corresponding to wheel 308b, and a third indicia corresponding to wheel 308c. Accordingly, the system indicates in this example that it has automatically located the top edge of the truck bin and the two highlighted tires, and accordingly does not require manual assistance.

In an embodiment, the system may enable a user to override the automatically determined element locations. For example, the user may recognize from displayed information that the system has automatically but incorrectly identified element locations, but that the system has color-coded or otherwise highlighted these elements to indicate that no manual assistance is required. The user in such embodiments may select or otherwise trigger a manual assistance mode wherein the system prompts the user to engage the first image layer and provide contextual information in a manner as further described below and generally relating to the user-generation of augmented reality images on the first image layer for enhancing the image processing algorithms.

Having identified the required elements for the first portion 320 of the automated loading feature (e.g., "Approach & Boom), the system may proceed by generating signals for controlling at least an approach of the work vehicle 100 and attachment 120 to the loading area 302, in association with a desired discharge of material. This may for example include calculating and implementing a trajectory for the drivetrain beginning at the current work vehicle position and speed and ending in an appropriate position corresponding to the loading area 302 with zero ground speed, using a visual measurement of the location and orientation of the loading area 302 relative to the work vehicle 100 to generate and implement a steering trajectory and dynamically adjust a steering angle of the work vehicle 100 to follow the trajectory as the work vehicle 100 approaches the loading area 302, and further calculating and implementing a trajectory for one or more attachments 120 (e.g., via the boom cylinder) beginning at the current height and ending at a loading height substantially synchronized with the arrival of the work vehicle 100 relative to the loading area 302, and/or applying closed loop controls to ensure the boom and drivetrain follow the calculated trajectories. The automated loading feature may further include calculating a trajectory to automatically adjust a height of an attachment 120 (e.g., the boom lift height) based on visual measurements of the height of the loading area (e.g., truck bed) 302.

With further reference to FIG. 5, also for the selected first portion 320 of the loading sequence, the system identifies additional parameters from the first image layer and generates the second image layer further including for example indicia 382 representing a current position of a closest portion of the work vehicle 100 and/or attachment 120 with respect to the loading area 302, indicia 384 representing a distance between the closest portion of the work vehicle/attachment and a required stopping distance from the loading area 302, indicia 386 representing a path along the ground surface 138 between the work vehicle 100 and the loading area 302, indicia 388 representing a vertical height of the indicia 360 corresponding to the top edge 304 of the truck bin, and indicia 390 representing a distance between the required stopping distance from the loading area and the indicia 360 corresponding to the top edge 304 of the truck bin.

As further represented in FIG. 6, the displayed images and the corresponding generated indicia are modified with travel of the work vehicle 100 along the path toward the loading area 302. In the example shown, the work vehicle has effectively traversed the horizontal path between the position illustrated in FIG. 5 and the stopping point with respect to the loading area, and the second image layer now includes the indicia 382 representing a current position of a closest portion of the work vehicle and/or attachment with respect to the loading area, the indicia 384 representing a distance value, the indicia 388 representing the vertical path to be traversed to the indicia 360 corresponding to the top edge 304 of the truck bin, and the indicia 390 representing the remaining horizontal path to be traversed to the indicia 360 corresponding to the top edge 304 of the truck bin.

In some cases, as for example represented in FIG. 4, the image processing may yield sufficiently clear results such that automation may be performed without requiring manual assistance, wherein the second indicia may be highlighted in a particular manner such as for example in bold face or colored green, etc.

Figure 7:
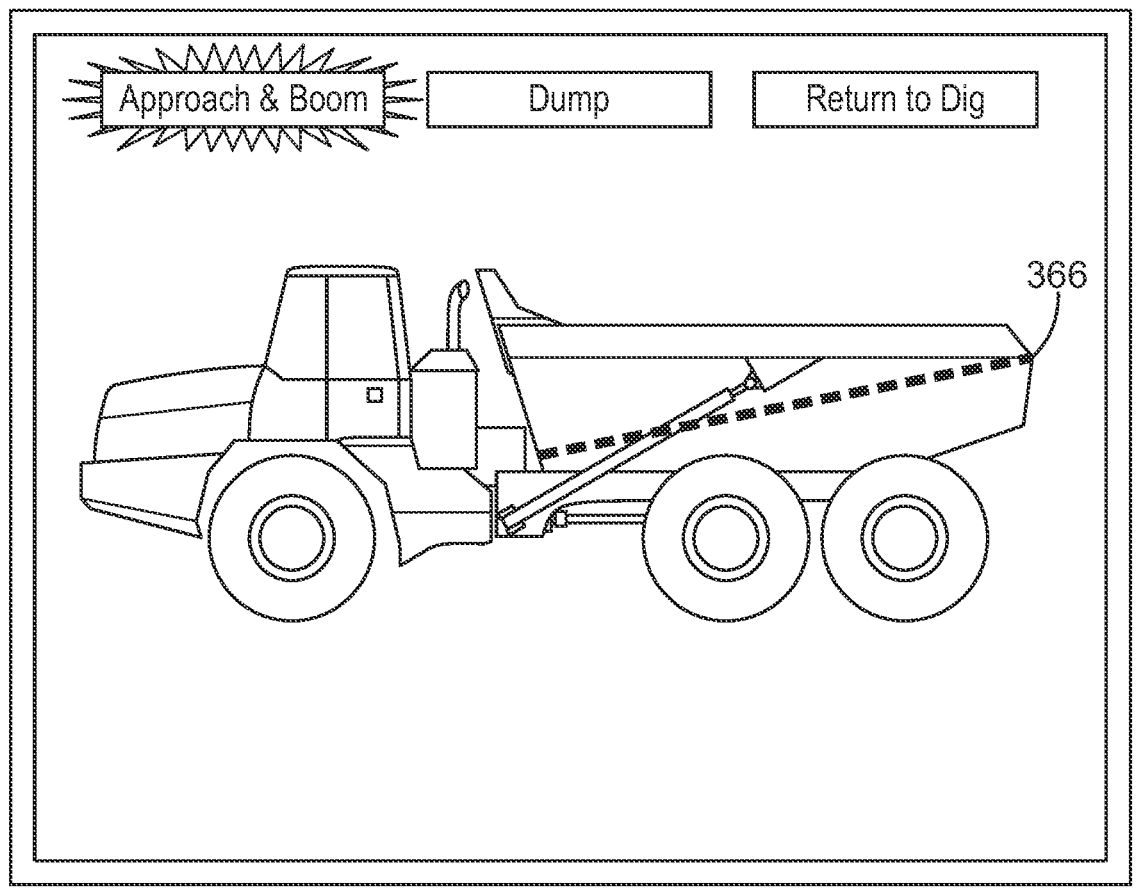
FIG. 7 is a graphical diagram representing the user interface of FIG. 3, displaying a loading area and highlighting that the contours are not sufficiently detectable for automated approach.

In other cases, where for example the image processing may be adversely affected by environmental conditions, the system may pause the automation sequence in recognition that it could not correctly identify the top edge 304 of the truck bin. One such example is represented in FIG. 7, wherein the top edge has automatically been identified via second image layer component 366 but the system recognizes that this component does not correspond with the actual top edge 304 or at least that there is an insufficient level of certainty in such determination. The system may accordingly prompt the user via the user interface 116 for manual assistance in the image processing and automation sequence (i.e., "yes" in response to the query in step 450). Again as shown in FIG. 7, the first portion of the loading sequence ("Approach & Boom") is highlighted accordingly, for example with a flashing indicator or using a different color such as yellow to distinguish from the aforementioned green.

In embodiments as represented herein, various particular forms of user interaction and associated contextual inputs may be described with respect to step 460, but such examples are illustrative and not intended as limiting on the scope of available user interactions and associated contextual inputs unless otherwise specifically stated herein.

Figure 8A:
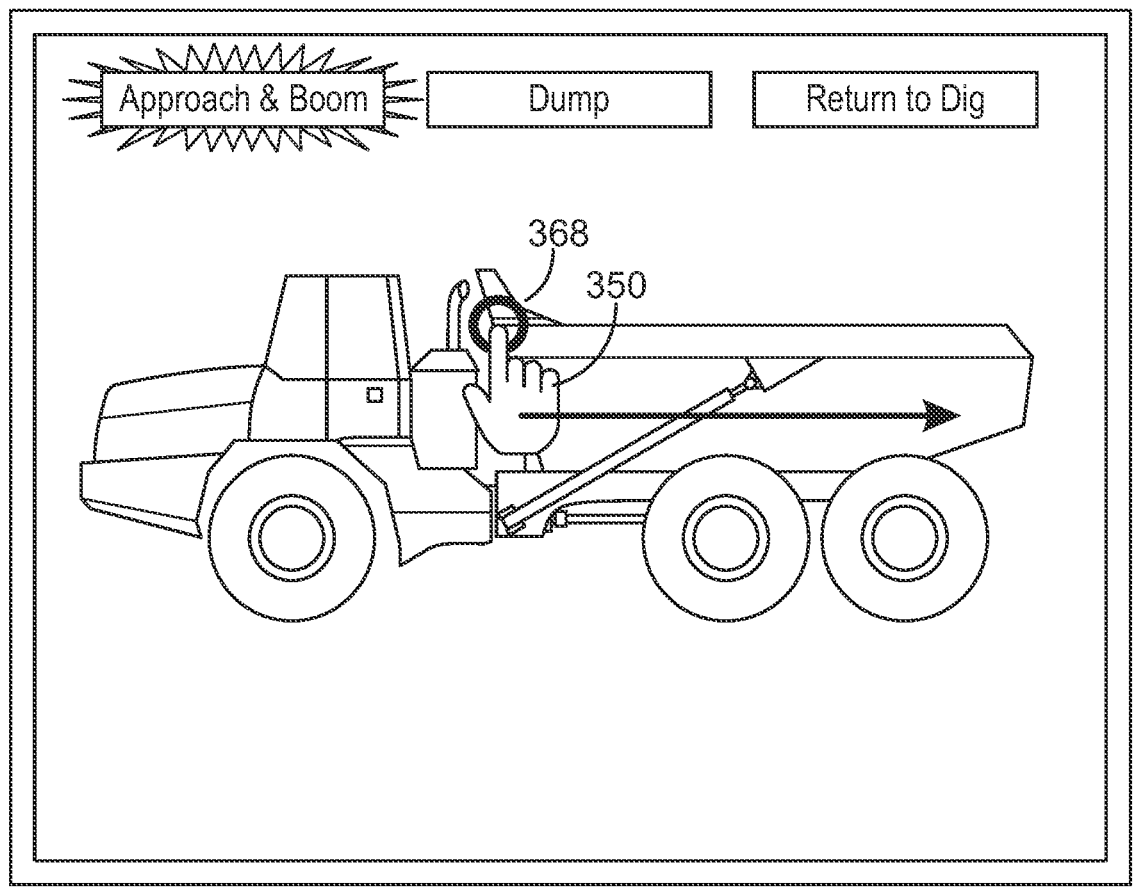
FIGS. 8A, 8B, and 9-12 are graphical diagrams representing the user interface of FIG. 7, displaying the loading area and user inputs for assisting in defining certain contours thereof.
Figure 8B:
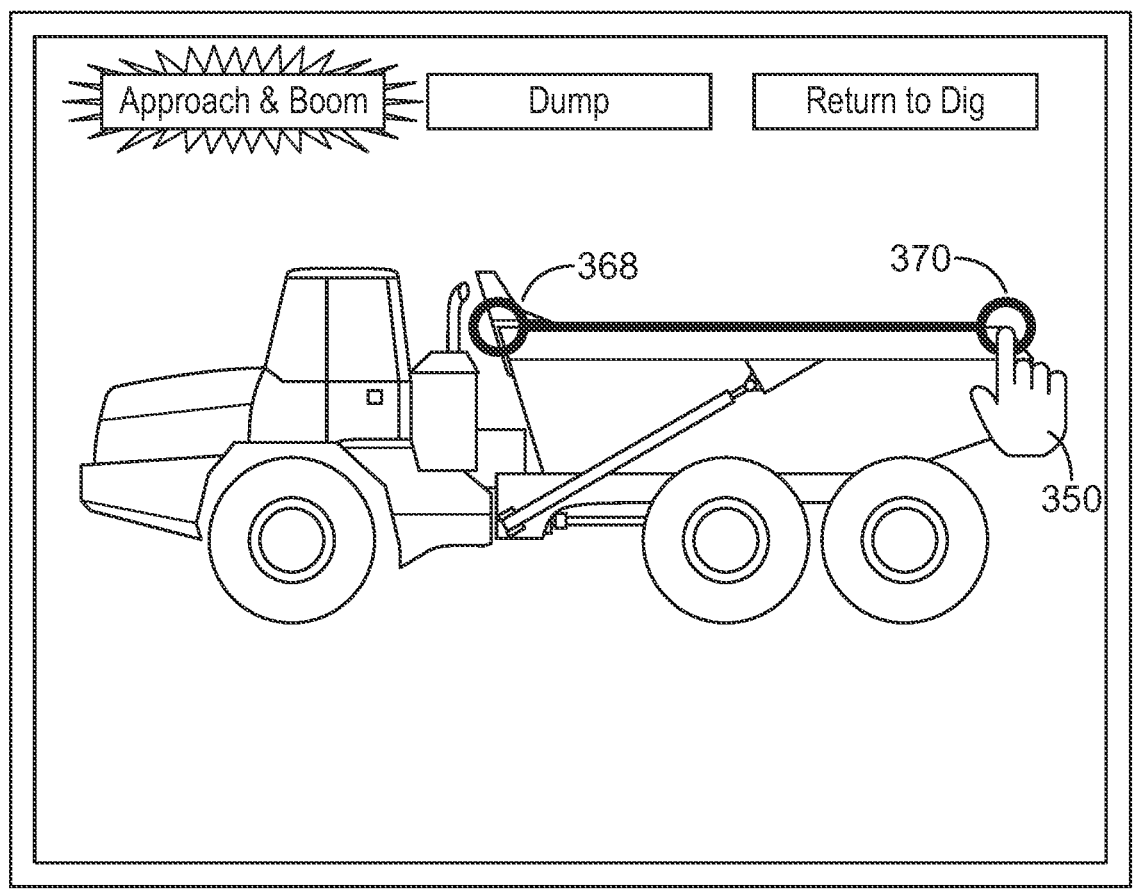

One first such exemplary contextual input may include a swipe engagement 462 by the user with respect to a certain portion of the displayed user interface for contextual inputs 300. One such portion of the contextual input display 300 may correspond to the upper 304 or side edges 306 of the bin on the truck 302. As represented in FIGS. 8A and 8B, an engagement of a cursor 350 with respect to the touch screen at a first point 368 is followed by a swipe movement to a second point 370. These inputs may trigger the vision system to execute an edge detection algorithm for the pixels in the vicinity of the swipe line and to log the pixel locations of the detected edge. The pixel line of the detected edge may be projected onto a detected surface plane representing the detectable portion of the sidewall of the bin, wherein the position of the projected line may for example be used as the edge of the sidewall 306 of the bin.

Other such exemplary contextual inputs may include a tap engagement 464 by the user with respect to a certain portion of the contextual input display 300, and/or a series of continuous engagements 466 by the user with respect to a certain portion of the contextual input display 300, for example defining a closed area associated with contours of the loading area 302.

Figure 9:
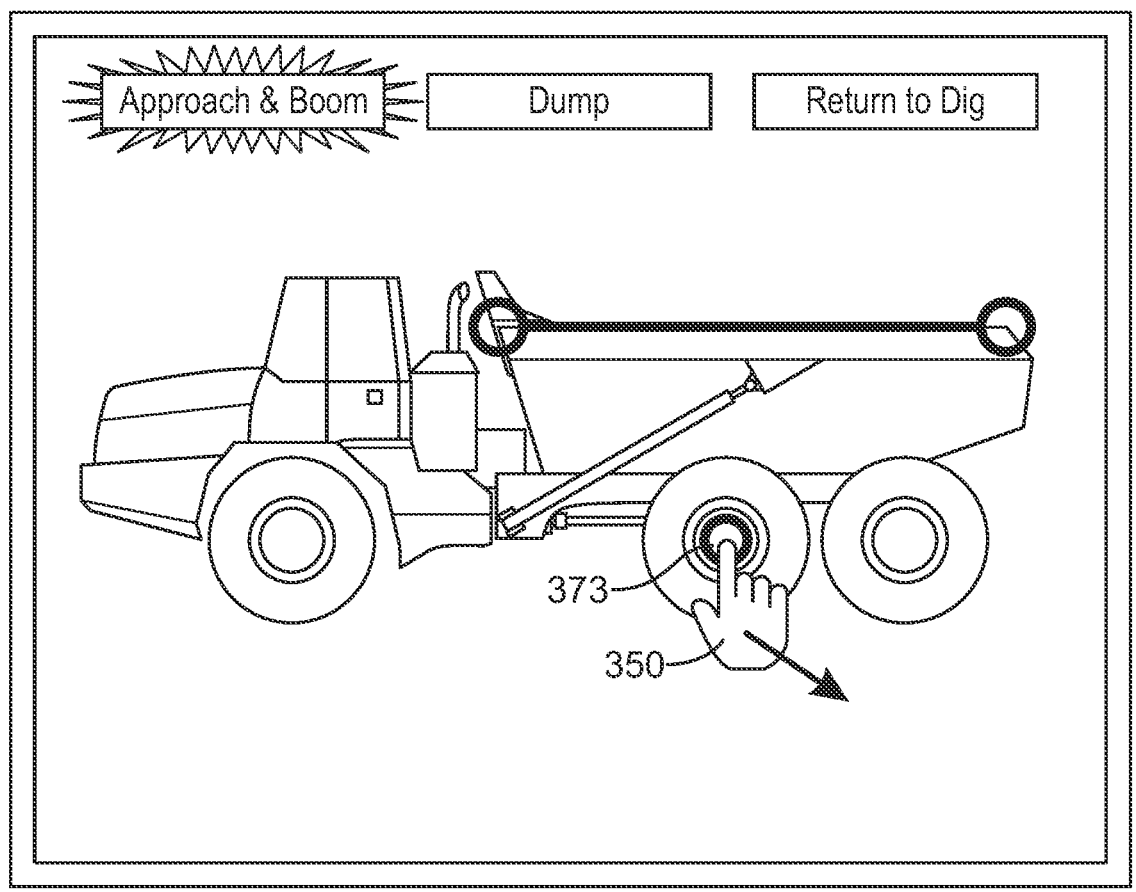
Figure 10:
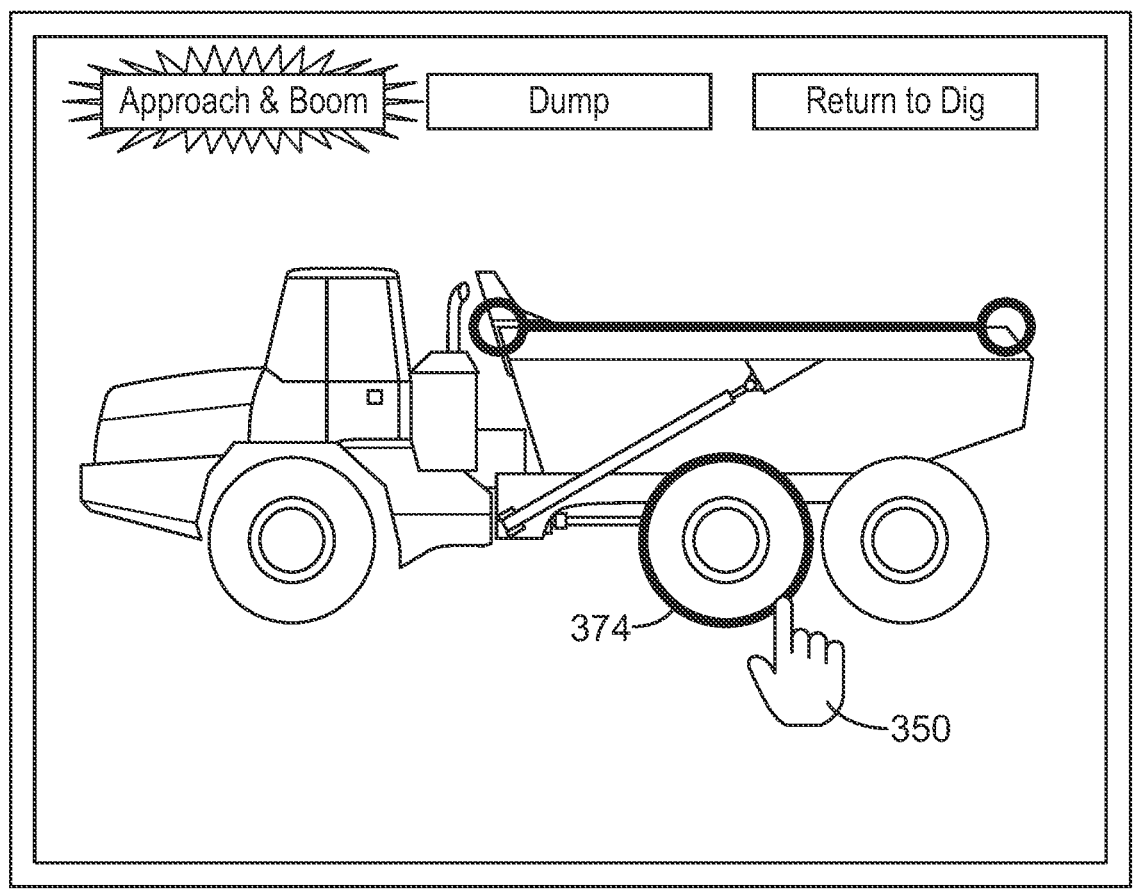
Figure 11:
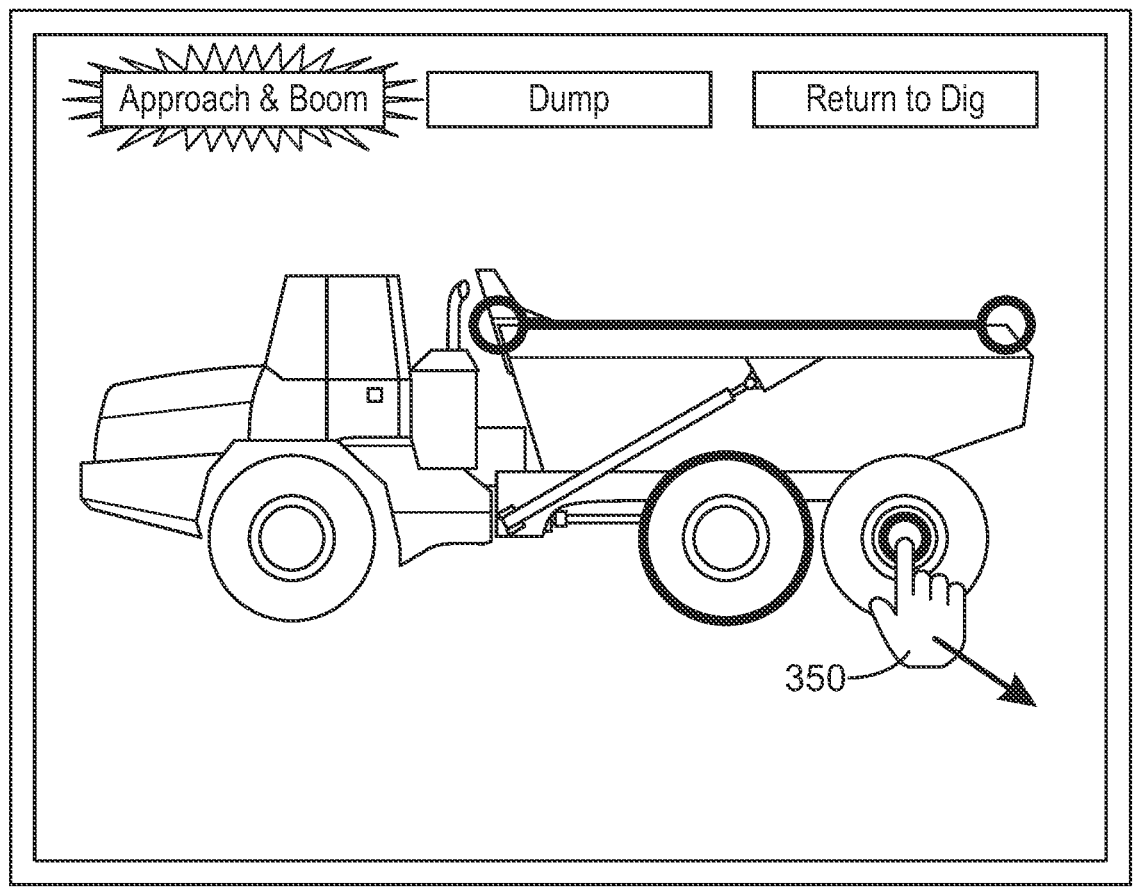
Figure 12:
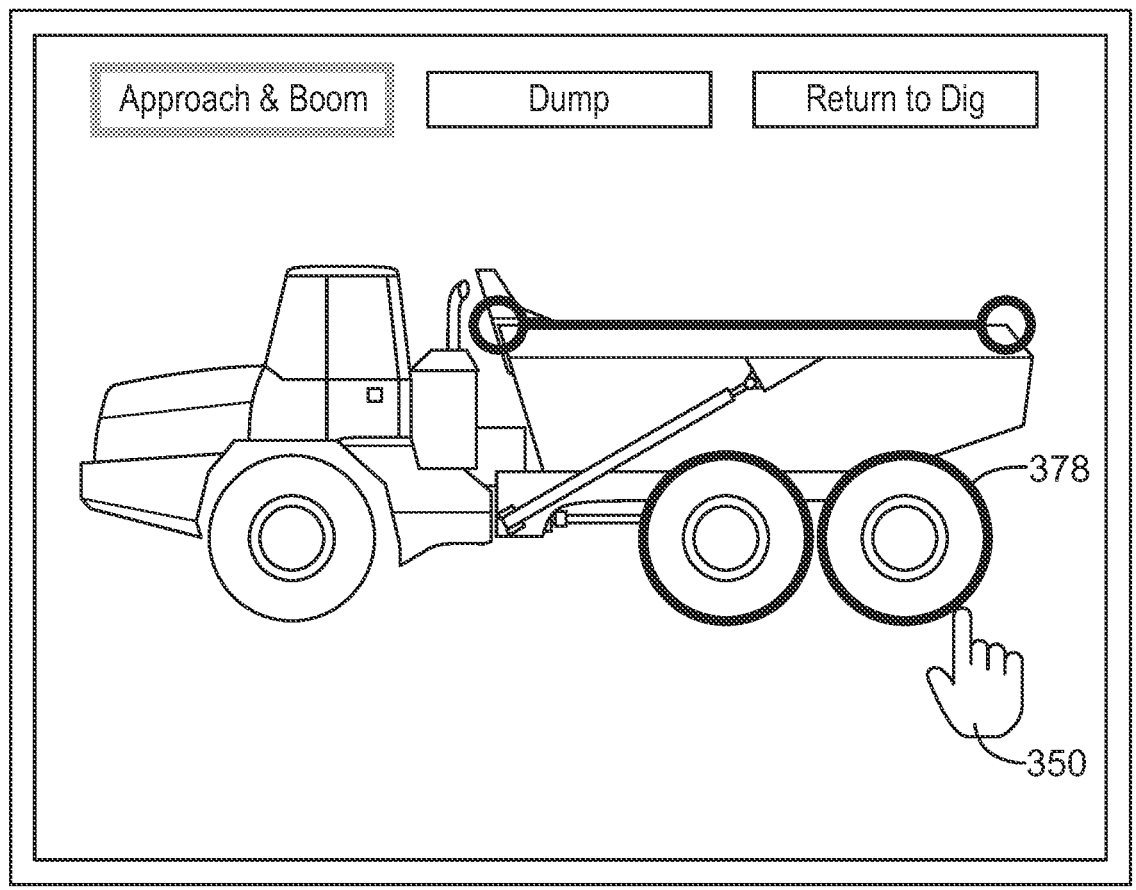

For example, a tap 464 or a drawn circle/ellipse 466 may be provided by the user via cursor 350 and implemented to indicate the location of one or more wheels associated with the first image layer. A tap 464 may be provided at a point 373 corresponding to the axle of wheel 308*b* as represented in FIG. 9, and/or a drawn circle/ellipse 466 may be provided to define a closed area 374 corresponding to the contours of the wheel 308*b* as represented in FIG. 10. A subsequent tap 464 may be provided via the cursor 350 at a point corresponding to the axle of wheel 308*c* as represented in FIG. 11, and/or a subsequently drawn circle/ellipse 466 may be provided to define a closed area 378 corresponding to the contours of the wheel 308*c* as represented in FIG. 12. These inputs may accordingly trigger the vision system to execute a blob detection algorithm for the pixels in the vicinity of a respective taps or drawn circles, and to run an ellipse fitting algorithm on the detected blob. Such an algorithm may associate all pixels within the ellipse as being the side of a tire and implement a best fit analysis with respect to a plane of the side of the tire. Stereo disparity measurements on the side of the tire may be used to solve the scaling ambiguity in the ellipse fitting algorithm. The location and size of the tire may be calculated relative to the imaging device, with the estimated lower edge of the tire being further used to define a ground contact for use in ground segmentation or sidewall height detection.

In other embodiments, a series of taps 464 may define other closed areas such as for example a first tap identifying a first (e.g., left) side of the loading container on the first image later and a second tap identifying a second (e.g., right) side of the loading contained on the first image layer. The taps may be provided in accordance with prompts from the system to identify specific sides of the loading container or other visible elements that may require further identification for the benefit of, e.g., the ellipse fitting algorithm.

A "tap" as discussed herein may typically include direct engagement of a touchscreen user interface using a manual tool or gesture (such as via a stylus, finger, etc.). Such a tap may also include indirect engagement of a user interface (e.g., "clicks") using interface tools such as a mouse or trackpad associated with an onscreen cursor or the like. Otherwise stated, taps as discussed herein are generally meant to encompass any tools, gestures, and/or back-end functionality as known by those of skill in the art for enabling the selection points on the respective image layer as displayed on the user interface, regardless of whether the user interface/display unit is associated with an onboard user interface, a mobile computing device, a remote desktop, laptop, or the like.

In another example, a closed area 466 comprising a sequence of multi-directional engagements such as polygon (e.g., typically a quadrilateral) has been traced to indicate contours such as a surface of the sidewall of the truck bin. This type of user input may trigger the system to run an edge detection algorithm along each line of the polygon as in the above-referenced edge indication process and associate the pixels within the drawn polygon as a single surface. All available distance measurements within the polygon may be combined into a best fit location and plane describing the surface. The pixels of the detected edges of the drawn polygon may be projected onto the best fit surface, wherein the real-world position of the indicated edges may be determined on the detected surface, and the edges of the sidewall associated with the necessary measurements for the control system.

Based at least in part on the contextual inputs from step 460, the method 400 may continue by algorithmically predicting one or more element contours and/or a location of the ground surface 470, wherein such details were not sufficiently determinable from the first image layer alone.

If the necessary contours and/or other elements are determinable with sufficient clarity from the processed images and the user inputs for context, the method may continue with automation of a user-selected portion of the loading sequence (e.g., approach to the loading area 302, loading of material into the loading area 302, and/or withdrawal from the loading area 302). As represented in FIG. 13, the contextual input display 300 indicates that the system is now able to continue on the first automated task ("Approach & Boom").

In the alternative, as represented in FIG. 14, a box corresponding to the first automated task may be highlighted (e.g., color coded red) 380 to indicate that manual takeover of the associated operation is required as automation is not available or otherwise advisable in view of, e.g., problems identifying the image elements even with the contextual inputs as described above.

Upon completion of a user-selected portion of the loading sequence, the method may further determine whether a subsequent portion of the loading sequence is further desirably automated, whether manual takeover is required, and/or whether a user prompt is appropriate to clarify. An automated discharge ("Dump") routine may for example include (using for illustrative purposes the context of a loader bucket) shifting of the work vehicle 100 into neutral, automatically dumping the bucket while lifting the boom to prevent the bucket from contacting the loading area 302, and indicating to the operator that dumping is complete and the work vehicle should be shifted into reverse.

If for example the user has specified that the automation sequence includes a return of the work vehicle 100 from the loading area 302 to a digging area and process, the method may further in step 490 include such a process and optionally prompt the user for clarification of captured images and associated elements therefor. The system may for example generate control signals associated with withdrawal of the work vehicle 100 and attachment 120 from the loading area 302, for example as may be provided for one or more of controlling the ground speed or the steering of the work vehicle 100 as it reverses to prevent the bucket from contacting the loading area 302, controlling the boom and bucket to prevent the bucket from contacting the loading area (e.g., truck bed) 302 as the loader reverses from the loading area 302, and returning the attachment to predetermined positions based on system settings. For example, during an illustrative and non-limiting withdrawal operation the bucket may be directed to a dig or carry position and the boom may be directed to a carry position.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

One of skill in the art may appreciate that when an element herein is referred to as being "coupled" to another element, it can be directly connected to the other element or intervening elements may be present.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A computer-implemented method of selective input confirmation for automated loading by a work vehicle comprising a main frame and at least one work attachment moveable with respect to the main frame and configured for loading and unloading material in a loading area external to the work vehicle during a loading process having one or more loading stages, the method comprising:

detecting, via at least one detector associated with the work vehicle, one or more location inputs for the loading area;

receiving first user inputs corresponding to selected automation for any one or more of the one or more loading stages;

for one or more selectively automated loading stages, executing detection routines with respect to parameters of the loading area based on the detected one or more location inputs, and determining whether one or more second user inputs are required with respect to one or more of the parameters of the loading area;

for any one or more of the parameters of the loading area requiring second user inputs,
- generating an image of the loading area on a user interface,
- receiving the one or more second user inputs, the one or more second user inputs comprising a swiped engagement of the user interface,
- automatically estimating one or more contours of a container associated with the loading area based at least on the generated image of the loading area and the one or more second user inputs, and
- automatically controlling at least movement of the main frame and/or the at least one work attachment for automating the corresponding loading stages based at least in part thereon.

2. The method of claim 1, comprising for any one or more of the parameters of the loading area requiring one or more second user inputs, prompting user input of the one or more second user inputs via a user interface and receiving the one or more second user inputs thereby.

3. The method of claim 1, wherein the step of detecting one or more location inputs comprises capturing images via one or more image data sources.

4. The method of claim 1, wherein the loading area parameters comprise one or more of: a distance between the loading area and the main frame; a distance between the loading area and the at least one work attachment; an orientation of the loading area respective to the main frame and/or at least one work attachment; a height of the loading area; polygonal contours of a container associated with the loading area; and circular or elliptical contours of vehicle wheels supporting the loading area.

5. The method of claim 1, the one or more second user inputs comprising a plurality of swiped engagements of the user interface to define a closed area therein.

6. A work vehicle comprising:
- a main frame;
- at least one work attachment moveable with respect to the main frame and configured for loading and unloading material in a loading area external to the work vehicle at least during a loading process having one or more loading stages;
- at least one detector configured to detect one or more location inputs for the loading area;
- a user interface configured to enable at least first user inputs corresponding to selected automation for any one or more of the one or more loading stages; and
- a controller configured:
  - for one or more selectively automated loading stages, to execute detection routines with respect to parameters of the loading area based on the detected one or more location inputs, and determine whether one or more second user inputs are required with respect to one or more of the parameters of the loading area;
  - to generate an image of the loading area on the user interface at least in association with a requirement of one or more second user inputs; and
  - for any one or more of the parameters of the loading area requiring second user inputs, to
    - receive the one or more second user inputs comprising a swiped engagement of the user interface,
    - automatically estimate one or more contours of a container associated with the loading area based at least on the generated image of the loading area and the one or more second user inputs, and
    - automatically control at least movement of the main frame and/or the at least one work attachment for automating the corresponding loading stages based at least in part thereon.

7. The work vehicle of claim 6, wherein the controller is further configured, for any one or more of the parameters of the loading area requiring one or more second user inputs, to prompt user input of the one or more second user inputs via the user interface and to receive the one or more second user inputs thereby.

8. The work vehicle of claim 6, wherein the at least one detector comprises an imaging device configured to capture images as at least some of the detected one or more location inputs.

9. The work vehicle of claim 6, wherein the loading area parameters comprise one or more of: a distance between the loading area and the main frame; a distance between the loading area and the at least one work attachment; an orientation of the loading area respective to the main frame and/or at least one work attachment; a height of the loading area; polygonal contours of a container associated with the loading area; and circular or elliptical contours of vehicle wheels supporting the loading area.

10. The work vehicle of claim 6, wherein the one or more second user inputs comprising a plurality of swiped engagements of the user interface to define a closed area therein.

11. A computer-implemented method of selective input confirmation for automated loading by a work vehicle comprising a main frame and at least one work attachment moveable with respect to the main frame and configured for loading and unloading material in a loading area external to the work vehicle during a loading process having one or more loading stages, the method comprising:
- detecting, via at least one detector associated with the work vehicle, one or more location inputs for the loading area;
- receiving first user inputs corresponding to selected automation for any one or more of the one or more loading stages;
- for one or more selectively automated loading stages, executing detection routines with respect to parameters of the loading area based on the detected one or more location inputs, and determining whether one or more second user inputs are required with respect to one or more of the parameters of the loading area;
- for any one or more of the parameters of the loading area requiring second user inputs,
  - generating an image of the loading area on a user interface,
  - receiving the one or more second user inputs, the one or more second user inputs comprising a circular or elliptical swiped engagement of the user interface to define a closed area therein, and/or one or more tapped engagements via the user interface,
  - automatically estimating a contour of a vehicle wheel associated with the loading area based at least on the generated image of the loading area and the one or more second user inputs, and
  - automatically controlling at least movement of the main frame and/or the at least one work attachment for automating the corresponding loading stages based at least in part thereon.

12. The method of claim 11, comprising for any one or more of the parameters of the loading area requiring one or more second user inputs, prompting user input of the one or more second user inputs via a user interface and receiving the one or more second user inputs thereby.

13. The method of claim 11, wherein the step of detecting one or more location inputs comprises capturing images via one or more image data sources.

14. The method of claim 11, wherein the loading area parameters comprise one or more of: a distance between the loading area and the main frame; a distance between the loading area and the at least one work attachment; an orientation of the loading area respective to the main frame and/or at least one work attachment; a height of the loading area; polygonal contours of a container associated with the loading area; and circular or elliptical contours of vehicle wheels supporting the loading area.

15. A work vehicle comprising:
a main frame;
at least one work attachment moveable with respect to the main frame and configured for loading and unloading material in a loading area external to the work vehicle at least during a loading process having one or more loading stages;
at least one detector configured to detect one or more location inputs for the loading area;
a user interface configured to enable at least first user inputs corresponding to selected automation for any one or more of the one or more loading stages; and
a controller configured:
for one or more selectively automated loading stages, to execute detection routines with respect to parameters of the loading area based on the detected one or more location inputs, and determine whether one or more second user inputs are required with respect to one or more of the parameters of the loading area;
to generate an image of the loading area on the user interface at least in association with a requirement of one or more second user inputs; and
for any one or more of the parameters of the loading area requiring second user inputs, to
receive the one or more second user inputs comprising a circular or elliptical swiped engagement of the user interface to define a closed area therein, and/or one or more tapped engagements via the user interface,
automatically estimate a contour of a vehicle wheel associated with the loading area based at least on the generated image of the loading area and the one or more second user inputs, and
automatically control at least movement of the main frame and/or the at least one work attachment for automating the corresponding loading stages based at least in part thereon.

16. The work vehicle of claim 15, wherein the controller is further configured, for any one or more of the parameters of the loading area requiring one or more second user inputs, to prompt user input of the one or more second user inputs via the user interface and to receive the one or more second user inputs thereby.

17. The work vehicle of claim 15, wherein the at least one detector comprises an imaging device configured to capture images as at least some of the detected one or more location inputs.

18. The work vehicle of claim 15, wherein the loading area parameters comprise one or more of: a distance between the loading area and the main frame; a distance between the loading area and the at least one work attachment; an orientation of the loading area respective to the main frame and/or at least one work attachment; a height of the loading area; polygonal contours of a container associated with the loading area; and circular or elliptical contours of vehicle wheels supporting the loading area.

* * * * *